United States Patent [19]

Horacek et al.

[11] 4,256,841

[45] Mar. 17, 1981

[54] MANUFACTURE OF LIGHT-STABLE POLYURETHANE INTEGRAL FOAMS

[75] Inventors: Heinrich Horacek, Ludwigshafen; Ernst Schoen, Neustadt; Erhardt Reich, Damme; Otto Volkert, Weisenheim, all of Fed. Rep. of Germany

[73] Assignee: BASF Aktiengesellschaft, Fed. Rep. of Germany

[21] Appl. No.: 38,853

[22] Filed: May 14, 1979

[30] Foreign Application Priority Data

Jun. 10, 1978 [DE] Fed. Rep. of Germany ....... 2825569

[51] Int. Cl.$^3$ ..................... C08G 18/24; C08G 18/20; C08G 18/75; C08G 18/77
[52] U.S. Cl. ..................................... 521/51; 521/124; 521/125; 521/126; 521/127; 521/129
[58] Field of Search ................. 521/51, 124, 125, 126, 521/127, 129

[56] References Cited

U.S. PATENT DOCUMENTS

| | | | |
|---|---|---|---|
| 3,476,933 | 11/1969 | Mendelsohn | 521/61 |
| 3,726,952 | 4/1973 | Boden et al. | 521/51 |
| 3,793,268 | 2/1974 | Dietrich et al. | 521/51 |
| 3,799,898 | 3/1974 | Lamplugh et al. | 521/905 |
| 3,824,199 | 7/1974 | Nadeau et al. | 521/51 |
| 3,899,454 | 8/1975 | Wagner et al. | 521/51 |
| 4,025,466 | 5/1977 | Jourquin et al. | 260/2.5 AC |
| 4,058,492 | 11/1977 | von Bonin et al. | 521/51 |
| 4,065,410 | 12/1977 | Schaefer et al. | 521/51 |
| 4,150,206 | 4/1979 | Jourquin et al. | 521/51 |

FOREIGN PATENT DOCUMENTS 2710910 9/1977 Fed. Rep. of Germany.

*Primary Examiner*—H. S. Cockeram
*Attorney, Agent, or Firm*—Keil & Witherspoon

[57] ABSTRACT

To prepare light-stable polyurethane integral skin foams, especially soft integral foams, aliphatic and/or cycloaliphatic polyisocyanates, both categories preferably containing urethane groups and/or biuret groups, are reacted with polyols in the presence of blowing agents and of a synergistic catalyst combination comprising an alkali metal hydroxide, alkali metal alcoholate, alkali metal phenolate, alkali metal salt of a weak acid and/or hexahydrotriazine derivative and an organic tin, zinc and/or iron(II) compound, in the presence or absence of assistants and adjuvants.

The preferred catalyst combination is tri-(dimethylaminopropyl)-s-hexahydrotriazine and dibutyl-tin dilaurate.

6 Claims, No Drawings

MANUFACTURE OF LIGHT-STABLE POLYURETHANE INTEGRAL FOAMS

The present invention relates to a process for the manufacture of light-stable polyurethane integral skin foams, especially soft integral foams, by reacting an aliphatic and/or cycloaliphatic polyisocyanate, either of which may or may not contain urethane and/or biuret groups, with a polyol in the presence of a blowing agent and of a synergistic catalyst combination comprising an alkali metal hydroxide, alkali metal alcoholate, alkali metal phenolate, alkali metal salt of a weak acid and/or hexahydrotriazine derivative and an organic tin, zinc and/or iron(II) compound, in the presence or absence of assistants and adjuvants.

Polyurethane foams have long been known. A review of the manufacture and properties of polyurethane foams is given, for example, in Kunststoff-Handbuch, volume VII, "Polyurethane" by R. Vieweg and A. Höchtlen, Verlag Carl Hanser, Munich 1966, or in the monograph by J. H. Saunders and K. C. Frisch "High Polymers", volume XVI, Polyurethanes, parts 1 and 2, Interscience Publishers 1962 and 1964.

Polyurethane foams manufactured from aromatic polyisocyanates and polyols are usually not light-stable, ie. they yellow when exposed to light. The reason for the yellowing is the formation of quinonoid structures from aromatic polymer units. It has therefore been proposed to reduce the light-sensitivity of the polyurethane foams by adding stabilizers, as a rule compounds which have a reducing action. It is true that such stabilizers can delay the yellowing, but they cannot suppress it completely. Since, for many applications, a yellowing or color change of the polyurethane foams is undesirable soft integral skin foams employed, for example, as cushioning, seats, headrests, dashboards and fenders in the automotive industry, must be either laminated with polymer films, or be surface-coated. The same remarks apply to thermoset resin foams, which are used for sports goods, window frames and as a wood substitute.

In the case of polyurethane elastomers and coatings the difficulties are circumvented by using aliphatic and/or cycloaliphatic polyisocyanates, in place of aromatic polyisocyanates, for the manufacture of the polyurethane. However, these methods have hitherto been unsuccessful in the manufacture of polyurethane foams, since the reactivity of aliphatic polyisocyanates is substantially less than that of the aromatic polyisocyanates.

According to the disclosures of German Laid-Open Application DOS No. 2,710,901 and U.S. Pat. No. 4,025,466, polyurethane foams or integral foams are manufactured using polyisocyanates whereof the NCO groups are not directly bonded to an aromatic radical, and catalyst combinations based on amines having a

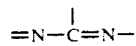

structure and alkaline earth metal salts of carboxylic acids having a dissociation constant $K_a < 10^{-1}$, alcoholates and phenolates and organic lead compounds, and compounds having primary or secondary amino groups.

A disadvantage of the processes described is that the polyurethane foams thus obtained have a low heat distortion point and in some cases have inadequate mechanical properties.

It is an object of the present invention to manufacture light-fast polyurethane integral skin foams, especially soft integral foams, in such a way that the reaction conditions, and the mechanical properties of the polyurethane integral foams obtained, correspond to those when using aromatic polyisocyanates.

We have found that this object is achieved by a process for the manufacture of light-stable polyurethane integral skin foams by reacting a mixture of organic polyisocyanates, polyols, catalysts and blowing agents, with or without assistants and adjuvants, wherein the organic polyisocyanates used are aliphatic and/or cycloaliphatic polyisocyanates, of which both categories may or may not contain urethane and/or biuret groups, and the catalysts used are synergistic catalyst combinations consisting of (A) one or more compounds from the group comprising the alkali metal hydroxides, alkali metal alcoholates, alkali metal phenolates, alkali metal salts of weak acids and/or hexahydrotriazine derivatives and (B) one or more compounds from the group comprising organic tin, zinc and/or iron(II) compounds.

Surprisingly, we have found that by the specific selection, according to the invention, of a strongly basic polyisocyanurate catalyst and an organo-metallic polyurethane catalyst from the plurality of conventional and commercially available polyisocyanurate and polyurethane catalysts, a synergistic catalyst combination is obtained, which can adequately catalyze the reaction of polyols with aliphatic or cycloaliphatic polyisocyanates. It is particularly advantageous that the preferentially used polyisocyanates containing urethane groups and/or biuret groups are non-toxic and that the ratio in which the polyol and polyisocyanate compounds are mixed can be varied within wide limits without causing collapse of the polyurethane integral skin foams obtained.

The following may, for example, be used as starting components for the manufacture, according to the invention, of the light-stable rigid and soft polyurethane integral skin foams:

Organic polyisocyanates which may be used according to the invention have the formula $R(NCO)_n$, where R is a polyvalent aliphatic or cycloaliphatic radical or a mixed radical of this type, which radicals may or may not contain urethane and/or biuret groups, and n is an integer which corresponds to the valency of R and is at least 2, preferably 2 or 3. Specific examples are aliphatic diisocyanates, eg. ethylene diisocyanate, 1,2-propylene diisocyanate, 1,4-butylene diisocyanate, 2,2,4-trimethyl-1,6-hexamethylene diisocyanate and preferably 1,6-hexamethylene diisocyanate, cycloaliphatic diisocyanates, such as 1,2-cyclohexane diisocyanate, 1,3-cyclohexane diisocyanate, 1,4-cyclohexane diisocyanate, 1-methyl-2,4-cyclohexane diisocyanate, 1-methyl-2,6-cyclohexane diisocyanate and the corresponding 1-methylcyclohexane diisocyanate isomer mixtures, 4,4'-, 2,4'- and 2,2'-dicyclohexylmethane diisocyanate and the corresponding isomer mixtures and, preferably, 3-isocyanatomethyl-3,5,5-trimethylcyclohexyl isocyanate and polyisocyanates, such as polycyclohexylpolymethylene polyisocyanates with from 2 to 6, preferably with 3, cyclohexylene radicals in the molecule.

Preferably, however, polyisocyanates containing urethane groups or, in particular, containing biuret groups, and mixtures of such compounds, prepared from aliphatic or cycloaliphatic polyisocyanates, are used. Polyisocyanates containing urethane groups may for example be obtained by reacting the above aliphatic or cycloaliphatic diisocyanates, preferably hexamethylene diisocyanate and isophorone diisocyanate, with alkanediols, which may or may not be substituted or modified, of 2 to 10, preferably 2 to 6, carbon atoms in the alkylene radical, eg. ethylene glycol, butane-1,4-diol, dipropylene glycol, hexane-1,6-diol and neopentylglycol, as well as neopentylglycol mono-hydroxypivalate or mixtures of these, in the molar ratio of about 2:1. The preparation of polyisocyanates containing biuret groups is described, for example, in U.S. Pat. Nos. 3,124,605 and 3,903,126, which are incorporated by reference. The polyisocyanates containing biuret groups have NCO contents of from 30 to 15, preferably from 25 to 20, % by weight and viscosities, at 20° C., of from 6,000 to 500, preferably from 1,000 to 4,000, m.Pas.

Suitable polyols are preferably polyester-ols and especially polyether-ols. However, it is also possible to use other hydroxyl-containing polymers having molecular weights of from 500 to 8,000 and hydroxyl numbers of from 20 to 500, for example polycarbonates, especially those prepared by trans-esterifying diphenyl carbonate with hexane-1,6-diol, polyacetals, eg. polyoxymethylene, and polyester-amides.

Suitable polyester-ols may for example be prepared from dicarboxylic acids, preferably from aliphatic dicarboxylic acids of 2 to 12 carbon atoms in the alkylene radical, and polyhydric alcohols, preferably diols. Examples of suitable acids are aliphatic dicarboxylic acids, eg. glutaric acid, pimelic acid, suberic acid, azelaic acid, sebacic acid, undecanedicarboxylic acid, dodecanedicarboxylic acid and, preferably, succinic acid and adipic acid, and aromatic dicarboxylic acids, such as phthalic acid and terephthalic acid. Examples of dihydric and polyhydric, especially dihydric, alcohols are ethylene glycol, diethylene glycol, 1,2- and 1,3-propylene glycol, dipropylene glycol, decane-1,10-diol, glycerol, trimethylolpropane, pentaerythritol and, preferably, butane-1,4-diol, hexane-1,6-diol and neopentylglycol. The polyester-ols have molecular weights of from 500 to 8,000, preferably from 1,000 to 4,000, and hydroxyl numbers of from 20 to 500, preferably from 50 to 200. The polyester-ols may be employed singly or in the form of mixtures.

However, particularly suitable polyols are polyether-ols having molecular weights of from 500 to 8,000, preferably from 1,000 to 4,000, and hydroxyl numbers of from 20 to 500, preferably from 50 to 200. The polyether-ols are prepared by conventional processes from one or more alkylene oxides of 2 to 4 carbon atoms in the alkylene radical and a starter molecule which contains from 2 to 8, preferably 2 or 3, active hydrogen atoms. Examples of suitable alkylene oxides are tetrahydrofuran, 1,3-propylene oxide, 1,2- and 1,3-butylene oxide, styrene oxide and, preferably, ethylene oxide and 1,2-propylene oxide. The alkylene oxides may be used singly, in alternation or as mixtures. Examples of suitable starter molecules are water, dicarboxylic acids, eg. succinic acid, adipic acid, phthalic acid and terephthalic acid, N,N'-dialkyl-substituted diamines, where alkyl is of 1 to 4 carbon atoms, for example N,N'-dimethyl-ethylenediamine, N,N'-dimethyl-1,2- and -1,3-propylenediamine, N,N'-diethyl-1,4-butylenediamine and N,N'-dimethyl-1,6-hexamethylenediamine, as well as N-alkyl-dialkanolamines, where alkyl is of 1 to 4 carbon atoms, eg. N-methyldiethanolamine, N-ethyldiethanolamine and N-butyl-diethanolamine, and preferably dihydric to octahydric, especially dihydric or trihydric, alcohols, eg. ethylene glycol, 1,2- and 1,3-propylene glycol, diethylene glycol, dipropylene glycol, 1,4-butylene glycol, 1,6-hexamethylene glycol, glycerol, trimethylolpropane, pentaerythritol, sorbitol and saccharose.

The polyether-ols may be used singly or in the form of mixtures.

Instead of the polyester-ols or polyether-ols, mixtures of polyester-ols and polyether-ols may also be employed, in which mixtures the weight ratio of polyester-ol to polyether-ol may be varied within wide limits, for example from 20:80 to 80:20, depending on the end use of the polyurethane integral foam to be manufactured.

It may at times be advantageous to employ chain extenders or crosslinking agents, in addition to the above polyols, when manufacturing the polyurethane integral skin foams. Suitable agents of this type are polyfunctional, especially difunctional and trifunctional, compounds with molecular weights of from 18 to 600, preferably from 60 to 300. For example, dialkanolamines and trialkanolamines, eg. diethanolamine and triethanolamine, and, preferably, aliphatic diols and triols of 2 to 6 carbon atoms, eg. ethylene glycol, 1,4-butylene glycol, 1,6-hexamethylene glycol, glycerol and trimethylolpropane, may be used.

An essential feature of the process according to the invention is the use of a synergistic catalyst combination consisting of (A) one or more compounds from the group comprising the alkali metal hydroxides, alkali metal alcoholates, alkali metal phenolates, alkali metal salts of weak acids and hexahydrotriazine derivatives and (B) one or more compounds from the group comprising the organic zinc compounds, iron(II) compounds and, preferably, tin compounds for accelerating the reaction between the aliphatic and/or cycloaliphatic polyisocyanates and polyols, in the presence or absence of water and chain extenders and/or cross-linking agents. The above catalyst combinations essentially comprise a strongly basic polyisocyanurate catalyst and an organo-metallic polyurethane catalyst. Suitable strongly basic polyisocyanurate catalysts include alkali metal hydroxides, especially sodium hydroxide and potassium hydroxide, alkali metal alcoholates, preferably sodium alcoholates and especially potassium alcoholates of alcohols of preferably 1 to 6 carbon atoms, eg. methanol, ethanol, propanol, isopropanol, n-butanol, iso-butanol and hexanol, phenolates, eg. sodium phenolate and potassium phenolate, salts of weak organic and inorganic acids, eg. sodium formate, potassium formate, sodium acetate, potassium acetate, sodium octoate, potassium octoate, sodium carbonate and potassium carbonate, and, preferably, hexahydrotriazine derivatives.

Particularly suitable hexahydrotriazine derivatives are 1,3,5-tris-(N,N-dialkylaminoalkyl)-s-hexahydrotriazines, for example 1,3,5-tris-(N,N-dimethyl-2-aminoethyl)-s-hexahydrotriazine, 1,3,5-tris-(N,N-dimethyl-3-aminopropyl)-s-hexahydrotriazine, 1,3,5-tris-(N,N-diethyl-2-aminoethyl)-s-hexahydrotriazine, 1,3,5-(N,N-diethyl-3-aminopropyl)-s-hexahydrotriazine and 1,3,5-tris-(N,N-dipropyl-2-aminoethyl)-s-hexahydrotriazine. For the purposes of the present invention, the use of 1,3,5-tris-(N,N-dimethyl-3-aminopropyl)-s-hexahydrotriazine is preferred.

These hexahydrotriazine components and their preparation are known and are described, for example, by Nicholas et al., Journal of Cellular Plastics 1 (1) (1965), 85 and by Graymore, Journal of the Chemical Society (1931), 1493.

The amounts of alkali metal hydroxide, alkali metal alcoholate, alkali metal phenolate, alkali metal salt of a weak acid and hexahydrotriazine derivative to be employed are from 0.01 to 5, preferably from 0.1 to 3, parts by weight per 100 parts by weight of polyol.

The other component of the catalyst combination is a zinc compound, iron(II) compound or, preferably, tin compound. Specific examples are iron acetylacetonate, zinc 2-ethyl-hexoate, zinc naphthenate, dibutyl-tin versatate and dibutyl-tin diacetate and preferably tin dioctoate and especially dibutyl-tin dilaurate. The amount of organic zinc compound, iron(II) compound or tin compound employed is from 0.01 to 5 parts by weight, preferably from 0.1 to 3 parts by weight, per 100 parts by weight of polyol.

A catalyst combination of tris-(N,N-dimethylaminopropyl)-s-hexahydrotriazine and dibutyl-tin dilaurate has proved particularly suitable and is therefore used preferentially.

A suitable blowing agent is water, which reacts with the polyisocyanates and provides carbon dioxide. Preferably, from 0.1 to 2% by weight, especially from 0.01 to 1% by weight, of water, based on the weight of polyol, is used. Instead of water, other, physically acting, blowing agents, or mixtures of water and physically acting blowing agents can be used. Physically acting blowing agents are usually chemically inert, low-boiling hydrocarbons or halohydrocarbons. For example, hydrocarbons or halohydrocarbons with boiling points, at atmospheric pressure, of below 50° C., preferably of from −50° C. to 30° C., are employed. Specific examples are halohydrocarbons, eg. monochlorodifluoromethane, dichloromonofluoromethane, dichlorodifluoromethane, trifluoromethane and mixtures of these, hydrocarbons, eg. propane and isobutane, and dimethyl ether. The amount of physically acting blowing agent which is required can readily be determined; it is a function of the desired foam density and is from about 2.5 to 20% by weight, preferably from 5 to 15% by weight, based on the weight of polyol. Suitable mixtures of water and hydrocarbons or halohydrocarbons in general comprise from 0.01 to 2% by weight, preferably from 0.1 to 1% by weight, of water and from 2.5 to 20% by weight, preferably from 5 to 10% by weight, of hydrocarbon or halohydrocarbon, the percentages being based on the weight of polyol.

Preferably, trichlorofluoromethane and methylene chloride, or a mixture of these blowing agents, in an amount of from 2.5 to 20 parts by weight per 100 parts by weight of polyol, are used to manufacture the integral skin foams. The content of water, where any is added, is usually less than 1 part by weight, preferably from 0.01 to 0.5 part by weight, per 100 parts by weight of polyol.

In addition, assistants and adjuvants, such as are conventionally used for the manufacture of polyurethane foams, may be incorporated into the foamable reaction mixtures. Examples include surfactants, flameproofing agents, pore regulators, antioxidants, anti-hydrolysis agents, colorants, fillers and other additives.

Suitable surfactants are, for example, compounds which serve to assist the homogenization of the starting materials and may also be able to regulate the cell structure of the polyurethane foams. Specific examples are siloxane-oxyalkylene copolymers and other organopolysiloxanes, oxyethylated alkylphenols, oxyethylated fatty alcohols, paraffin oils, castor oil, ricinoleic acid esters and turkey red oil; these are used in amounts of from 0.2 to 6 parts by weight per 100 parts by weight of polyisocyanate.

Flameproofing agents may be incorporated into the light-stable polyurethane foams manufactured according to the invention, in order to improve their flame-retardant characteristics. Examples are compounds containing phosphorus and/or halogen which can additionally reduce the brittleness of the foams and act as plasticizers, eg. tricresyl phosphate, tris-2-chloroethyl phosphate, tris-chloropropyl phosphate and tris-2,3-dibromopropyl phosphate, and inorganic flameproofing agents, eg. antimony trioxide, arsenic oxide, ammonium phosphate and the like. In general, it has proved advantageous to use from 1 to 10 parts by weight of the said flameproofing agents per 100 parts by weight of polyisocyanate.

Further data relating to the above additional conventional assistants and adjuvants are to be found in the relevant literature, for example the monograph by J. H. Saunders and K. C. Frisch "High Polymers", volume XVI, Polyurethanes, parts 1 and 2, Interscience Publishers 1962 and 1964.

The polyurethane integral skin foams are manufactured by conventional methods known for aromatic polyisocyanates, for example by the prepolymer process and preferably by the one-shot process.

If the polyurethane integral skin foams are manufactured by the one-shot process, the conventional procedure is to react a mixture of polyol, catalyst and blowing agent, with or without chain extender, crosslinking agent, assistants and adjuvants, with the aliphatic and-/or cycloaliphatic polyisocyanate at from 15° to 60° C., preferably from 20° to 50° C., the amounts used being such that the ratio of hydroxyl groups of the polyol, together with any NCO-active hydrogen atoms of the chain extender and/or crosslinking agent, to NCO groups of the polyisocyanate is from 0.8:1 to 1.2:1, preferably about 1:1. If a mixing chamber with several feed nozzles is used, the liquid starting materials may be introduced individually or, where the components are solid, in the form of a solution or suspension, and be mixed thoroughly in the mixing chamber. However, it has proved particularly advantageous to employ the two-component process and use a mixture of polyol, catalyst and blowing agent, with or without chain extender and/or crosslinking agent, assistants and adjuvants, as component A, and the aliphatic and/or cycloaliphatic polyisocyanate as component B.

Regarding the manufacture of the integral skin foams, reference may also be made to the relevant technical literature, for example to A. Nicolay et al., Gummi, Asbest, Kantschuk 30, No. 4 (1977), 226–232 and H. Y. Fabris, Advances in Urethane Technology, 2 (1973), 203–220.

The polyurethane integral skin foams manufactured according to the invention have densities of from about 60 to 600 g/l and are particularly distinguished by their light stability.

The flexible products are particularly suitable for the manufacture of automotive components, eg. headrests, armrests, crash pads and fenders, shoe soles and sports mats.

The rigid products are used in sports goods and window frames and as a wood substitute.

In the Examples, parts are by weight.

Index of abbreviations used in the Table of the Examples:

| A-component: | | Molecular weight | Functionality | OH-number | Starter | Ethylene oxide | Propylene oxide |
|---|---|---|---|---|---|---|---|
| Polyols | A | 6,500 | 3 | 26 | TMP | + | + |
| | B | 4,000 | 2 | 28 | EG | + | + |
| | C | 4,900 | 3 | 35 | GLY | + | + |
| | D | 465 | 4 | 480 | EDA | — | + |
| | E | 2,000 | 2 | 58 | GLY | + | + |
| | F | 3,100 | 3 | 550 | GLY | — | + |
| | G | 2,000 | 2 | 56 | PG | — | + |
| | H | 2,000 | 2 | 56 | | | |
| Polyesterols | I | 2,000 | 2 | 56 | | | |

| Chain extenders: | B 1,4 | 1,4-Butanediol |
|---|---|---|
| | EG | Ethylene glycol |
| | PG | Propylene glycol |
| Crosslinking agents: | GLY | Glycerol |
| | TMP | Trimethylolpropane |
| | ®Ortegol 615 (from Goldschmidt AG) | |
| | EDA | Ethylenediamine |
| | Lu 3420 | An adduct of ethylenediamine and propylene oxide, OH-number 480 |
| Catalysts: 1. | Polyurethane catalysts: | |
| | DBTDL | Dibutyl-tin dilaurate |
| | Sn Oct | Tin dioctoate |
| | Zn Oct | Zinc dioctoate |
| | Fe acetylacetonate | |
| | DBTDA | Dibutyl-tin diacetate |
| | DBTV | Dibutyl-tin versatate |
| 2. | Polyisocyanurate catalysts: | |
| | KOH | = 33% strength by weight potassium hydroxide solution in EG |
| | K But | = 33% strength by weight potassium tert.-butylate solution in EG |
| | K Phen | = 33% strength by weight potassium phenolate solution in EG |
| | K Oct | = 50% strength by weight potassium octoate solution in propylene glycol |
| | K Ac | = 33% strength by weight potassium acetate solution in EG |
| | KF | = 33% strength by weight potassium formate solution in EG |
| | HHT | = Tris-(N,N-dimethylaminopropyl)-s-hexahydrotriazine |
| Foam stabilizers: | | ®Tegostab B 3471 (Goldschmidt) |
| | | ®Tegostab B 4113 (Goldschmidt) |
| | | ®Tegostab B 2888 (Goldschmidt) |
| Emulsifiers: | SM | (from Bayer) |
| | OS 710 | (from Bayer) |
| | TDAO | Tridecylammonium oleate |
| Blowing agents: | F 11 | Monofluorotrichloromethane |
| | F 12 | Difluorodichloromethane |
| | F 113 | Trifluorotrichloromethane |

| B-component: | | |
|---|---|---|
| Isocyanates: | HMDI | Hexamethylene diisocyanate |
| | TMHMDI | Trimethylhexamethylene diisocyanate |
| | H$_{12}$MDI | Dicyclohexylmethylene diisocyanate |
| | IPDI | Isophorone diisocyanate |
| | XDI | Xylylene diisocyanate |
| Isocyanate prepolymers: | | |
| HMDI biuret | | Biuretized hexamethylene diisocyanate from 3 moles of HMDI |
| HMDI HPN | | Reaction product of 1 mole of neopentylglycol mono-hydroxypivalate and 2 moles of HMDI |
| HMDI DPG | | Reaction product of 1 mole of dipropylene glycol and 2 moles of HMDI |

Notes on the Table showing the Examples:
The entries in the first column to all subsequent columns unless a fresh entry is shown. The test data of the foams have been obtained in accordance with the following DIN and ASTM Standard Specifications:

| | |
|---|---|
| Tensile strength and elongation | DIN 53,571 |
| Tear propagation test | DIN 53,515 |
| Shore A hardness | DIN 53,505 |
| E-modulus (flexural test), flexural strength | DIN 53,423 |
| Compressive strain at 10% compression | DIN 53,421 |
| Shore D hardness | DIN 53,505 |
| ΔY (yellowness index difference) | ASTM D 1925 |

| Polyurethane soft integral skin foam Example No. Starting materials | 1 Parts | 2 Parts | 3 Parts | 4 Parts |
|---|---|---|---|---|
| Polyols | A 21 | A 21 | A 21 | A 21 |
| | B 68 | B 68 | B 68 | B 68 |
| Chain extenders | B 1,4 8 | B 1,4 8 | B 1,4 8 | B 1,4 8 |
| Crosslinking agents | EG 0.5 | EG 0.5 | EG 0.5 | EG 0.5 |
| A Catalysts | DBTDL 3 | DBTDL 3 | Sn Oct 3 | DBTDL 3 |
| | KOH 0.75 | HHT 3 | KOH 0.75 | KOH 0.75 |
| Foam stabilizers | | | | SM 1 |
| Blowing agents | F 11 6 | F 11 6 | F 11 6 | F 11 15 |
| | Water 0.5 | Water 0.5 | Water 0.5 | — |
| B Isocyanates | HMDI biuret 50 | HMDI biuret 100 | HMDI biuret 50 | HMDI biuret 50 |
| | HMDI DPG 50 | — | HMDI DPG 50 | HMDI HPN 50 |
| Ratio B/100 A | 70 | 51 | 80 | 80 |
| Free density kg/m$^3$ | 180 | 180 | 180 | 100 |
| Pot life sec | 30 | 50 | 70 | 25 |
| Rise time sec | 60 | 75 | 120 | 50 |
| Molded density kg/m$^3$ | 400 | 600 | 400 | 350 |
| Tensile strength N/mm$^2$ | 0.8 | 1.4 | 0.8 | 1.0 |
| Elongation % | 120 | 100 | 110 | 120 |
| Tear propagation resistance N/mm | 2.0 | 2.5 | 3.0 | 2.0 |
| Shore A hardness | 45 | 50 | 40 | 40 |
| Δ(xenon test, 500 h) | 0.5 | 1 | 3 | 5 |

| Polyurethane soft integral skin foam Example No. Starting materials | 5 Parts | 6 Parts | 7 Parts | 8 Parts |
|---|---|---|---|---|
| Polyols | C 41 | C 41 | C 41 | C 41 |
| | B 25 | B 25 | B 25 | B 25 |
| Chain extenders | B 1,4 11 | B 1,4 11 | B 1,4 11 | B 1,4 11 |
| A Crosslinking agents | Lu 3420 1 | Lu 3420 1 | Lu 3420 1 | Lu 3420 1 |
| Catalysts | HHT 3 | HHT 3 | KOH 0.75 | KOH 1.5 |
| | DBTDL 3 | DBTDL 3 | Zn Oct 3 | DBTL 1.5 |

-continued

| | | | | |
|---|---|---|---|---|
| Foam stabilizers | | Tegostab 0.3 B 3471 | Tegostab 0.3 B 3471 | — |
| | SM 0.5 | SM 0.5 | SM 0.5 | SM 0.25 |
| Blowing agents | F 11 20 | — | F 11 20 | F 11 15 |
| | | Water 0.8 | — | — |
| B Isocyanates | HMDI 50 biuret | HMDI 50 | HMDI 50 | HMDI 50 |
| | HMDI DPG 50 | HMDI DPG 50 | HMDI DPG 50 | HMDI DPG 50 |
| Ratio B/100 A | 80 | 80 | 70 | 70 |
| Free density kg/m³ | 90 | 140 | 90 | 90 |
| Pot life sec | 35 | 35 | 23 | 33 |
| Rise time sec | 60 | 75 | 45 | 70 |
| Molded density kg/m³ | 350 | 300 | 400 | 250 |
| Tensile strength N/mm² | 1.1 | 1.0 | 1.1 | 0.7 |
| Elongation % | 130 | 130 | 100 | 140 |
| Tear propagation resistance N/mm | 3.0 | 2.0 | 4 | 2 |
| Shore A hardness | 35 | 50 | 60 | 24 |
| ΔY (xenon test 500 h) | 2 | 0 | 5 | 3 |

| Polyurethane soft integral skin foam | | | | |
|---|---|---|---|---|
| Example No. | 9 | 10 | 11 | 12 |
| Starting materials | Parts | Parts | Parts | Parts |
| Polyols | C 41 | C 41 | C 41 | C 41 |
| | B 25 | B 25 | B 25 | B 25 |
| Chain extenders | B 1,4 11 | B 1,4 11 | B 1,4 11 | B 1,4 11 |
| A Crosslinking agents | | | | |
| Catalysts | HHT 3 | HHT 3 | HHT 3 | HHT 3 |
| | DBTDL 3 | DBTDL 3 | DBTDL 3 | DBTDL 3 |
| Foam stabilizers | Tegostab 0.3 B 3471 | Tegostab 0.3 | Tegostab 0.3 | Tegostab 0.3 |
| | SM 0.5 | SM 0.5 | SM 0.5 | SM 0.5 |
| Blowing agent | F 11 20 | F 11 20 | F 11 20 | F 11 20 |
| B Isocyanates | HMDI 100 | TMHMDI 100 | H₁₂MDI 100 | IPDI 100 |
| Ratio B/100 A | 27 | 35 | 45 | 35 |
| Free density kg/m³ | 50 | 50 | 60 | 70 |
| Pot life sec | 15" | 25" | 35 | 90" |
| Rise time sec | 20" | 35" | 80 | 200" |
| Molded density kg/m³ | 200 | 200 | 250 | 300 |
| Tensile strength N/mm² | 1.0 | 1.1 | 0.8 | 0.9 |
| Elongation % | 50 | 50 | 70 | 100 |
| Tear propagation resistance N/mm | 2 | 2.2 | 1.5 | 2.0 |
| Shore A hardness | 30 | 35 | 25 | 35 |
| ΔY (xenon test 500 h) | 2 | −1 | 2 | 5 |

| Polyurethane soft integral skin foam | | | | |
|---|---|---|---|---|
| Example No. | 13 | 14 | 15 | 16 |
| Starting materials | Parts | Parts | Parts | Parts |
| Polyols | A 21 | A 21 | A 21 | A 21 |
| | B 68 | B 68 | B 68 | B 68 |
| Chain extenders | B 1,4 8 | B 1,4 8 | B 1,4 8 | B 1,4 8 |
| A Crosslinking agents | EG 0.5 | EG 0.5 | EG 0.5 | EG 0.5 |
| Catalysts | DBTDL 3.0 | DBTDL 3.0 | DBTDL 3.0 | Sn Oct 3.0 |
| | K But 0.75 | K phenolate 1.5 | K octoate 3.0 | K acetate 3.0 |
| Foam stabilizers | Tegostab B 3471 0.3 | B 3471 0.3 | B 3471 0.3 | B 3471 0.3 |
| | SM 0.5 | SM 0.5 | SM 0.5 | SM 0.5 |
| Blowing agents | F 11 6 | F 11 6 | F 11 6 | F 11 6 |
| | | | F 113 6.0 | F 113 6.0 |
| B Isocyanates | HMDI biuret 50 | biuret 50 | biuret 50 | biuret 50 |
| | HMDI DPG 50 | HMDI DPG 50 | HMDI DPG 50 | HMDI DPG 50 |
| Ratio B/100 A | 70 | 70 | 70 | 70 |
| Free density kg/m³ | 150 | 200 | 150 | 150 |
| Pot life sec | 35 | 40 | 35 | 55 |
| Rise time sec | 75 | 100 | 70 | 150 |
| Molded density kg/m³ | 600 | 600 | 350 | 400 |
| Tensile strength N/mm² | 2.0 | 2.0 | 1.5 | 1.3 |
| Elongation % | 120 | 150 | 170 | 160 |
| Tear propagation resistance N/mm | 3.5 | 2.5 | 2 | 2 |
| Shore A hardness | 50 | 40 | 35 | 40 |
| ΔY (xenon test 500 h) | 0.7 | 6 | 3 | 5 |

| Polyurethane soft integral skin foam | | | | |
|---|---|---|---|---|
| Example No. | 17 | 18 | 19 | 20 |
| Starting materials | Parts | Parts | Parts | Parts |
| Polyols | C 80 | C 80 | C 80 | C 80 |

-continued

|  | | | | |
|---|---|---|---|---|
| Chain extenders | G 10<br>B 1,4 10 | G 10<br>B 1,4 10 | G 10<br>B 1,4 10 | G 10<br>B 1,4 10 |
| A Crosslinking agents | Ortegol<br>615 4.5 | 615 4.5 | 615 4.5 | 615 4.5 |
| Catalysts | HHT 3<br>DBTDL 3 | KOH 0.75<br>DBTDL 3 | KF 0.75<br>DBTDL 3 | KF 0.75<br>DBTDL 3 |
| Foam stabilizers | Tegostab<br>B 9113 0.5 | B 9113 0.5 | B 9113 0.5 | B 9113 0.5 |
| Blowing agents | F 11 5<br>Water 0.5 | F 11 5<br>Water 0.5 | F 11 5<br>Water 0.5 | F 11 5<br>Water 0.5 |
| B Isocyanates | HMDI biuret 100 | HMDI biuret 50<br>HMDI DPG 50 | HMDI 100<br>— | HMDI biuret 50<br>HMDI HPN 50 |
| Ratio B/100 A | 60 | 65 | 26 | 65 |
| Free density .kg/m³ | 180 | 100 | 90 | 110 |
| Pot life sec | 42 | 25 | 12 | 30 |
| Rise time sec | 70 | 50 | 35 | 80 |
| Molded density kg/m³ | 250 | 300 | 150 | 250 |
| Tensile strength N/mm² | 1.0 | 1.2 | 0.5 | 1.5 |
| Elongation % | 110 | 150 | 120 | 130 |
| Tear propagation resistance N/mm | 2.5 | 2.0 | 1.0 | 2.0 |
| Shore A hardness | 45 | 35 | 40 | 30 |
| ΔY (xenon test 500 h) | 0.5 | 3 | 3 | 5 |

Polyurethane soft integral skin foam

| Example No. | 21 | 22 | 23 | 24 |
|---|---|---|---|---|
| Starting materials | Parts | Parts | Parts | Parts |
| Polyols | I 75 | I 75 | I 75 | I 75 |
| Chain extenders | EG 10 | EG 10 | EG 10 | EG 10 |
| A Crosslinking agents | | | | |
| Catalysts | HHT 3<br>DBTDL 3 | HHT 3<br>Sn Oct 3 | KOH 0.75<br>DBTDL 3 | KBut 1.0<br>DBTDL 3.0 |
| Foam stabilizers | Tegostab<br>B 2888 0.3<br>SM 0.3 | B 2888 0.3<br>SM 0.3 | B 2888 0.3<br>SM 0.3 | B 2888 0.3<br>SM 0.3 |
| Blowing agent | F 11 13 | F 11 13 | F 11 13 | F 11 13 |
| B Isocyanates | HMDI<br>biuret 50<br>HMDI DPG 50 | biuret 50<br>HMDI DPG 50 | biuret 50<br>HMDI DPG 50 | biuret 50<br>HMDI DPG 50 |
| Ratio B/100 A | 100 | 100 | 100 | 100 |
| Free density .kg/m³ | 150 | 150 | 150 | 160 |
| Pot life sec | 25 | 28 | 20 | 15 |
| Rise time sec | 60 | 75 | 50 | 30 |
| Molded density kg/m³ | 450 | 350 | 450 | 600 |
| Tensile strength N/mm² | 1.0 | 0.8 | 1.1 | 2 |
| Elongation % | 120 | 150 | 140 | 130 |
| Tear propagation resistance N/mm | 8.0 | 7.0 | 8.0 | 9 |
| Shore A hardness | 60 | 55 | 70 | 80 |
| ΔY (xenon test 500 h) | 1 | 2 | 1.5 | 3 |

Polyurethane soft integral skin foam

| Example No. | 25 | 26 | 27 | 28 |
|---|---|---|---|---|
| Starting materials | Parts | Parts | Parts | Parts |
| Polyols | H 86 | H 86 | H 86 | H 86 |
| Chain extenders | B 1,4 11 | B 1,4 11 | B 1,4 11 | B 1,4 11 |
| A Crosslinking agents | Gly 0.5 | Gly 0.5 | Gly 0.5 | Gly 0.5 |
| Catalysts | HHT 3<br>DBTDL 3 | HHT 3<br>DBTDL 3 | HHT 3<br>DBTDL 3 | HHT 3<br>DBTDL 3 |
| Foam stabilizers | Tegostab<br>2888 0.2 | 2888 0.2 | 2888 0.2<br>SM 1 | 2888 0.2<br>— |
| Blowing agents | F 11 10<br>Water 0.5 | F 11 10<br>Water 0.5 | F 11 10<br>— | F 11 10<br>— |
| B Isocyanates | HMDI<br>biuret 50<br>HMDI DPG 50 | HMDI DPG 100<br>— | HMDI biuret 50<br>HMDI HPN 50 | HMDI biuret 100<br>— |
| Ratio B/100 A | 80 | 90 | 90 | 85 |
| Free density .kg/m³ | 150 | 150 | 160 | 160 |
| Pot life sec | 40 | 40 | 38 | 35 |
| Rise time sec | 75 | 75 | 70 | 60 |
| Molded density kg/m³ | 300 | 350 | 450 | 400 |
| Tensile strength N/mm² | 0.8 | 0.9 | 1.5 | 1.5 |
| Elongation % | 150 | 140 | 150 | 120 |
| Tear propagation resistance N/mm | 2.5 | 3.0 | 3.5 | 3 |
| Shore A hardness | 30 | 45 | 45 | 50 |
| ΔY (xenon text 500 h) | 0.7 | 1 | 2.5 | 0 |

Polyurethane rigid integral skin foam

-continued

| Example No. | 29 | 30 | 31 | 32 |
|---|---|---|---|---|
| Starting materials | Parts | Parts | Parts | Parts |
| Polyols | D 30 | D 30 | D 30 | D 30 |
|  | E 48 | E 48 | E 48 | E 48 |
| Chain extenders | EG 4.5 | EG 4.5 | EG 4.5 | EG 4.5 |
| A Crosslinking agents | TMP 12 | TMP 12 | TMP 12 | TMP 12 |
| Catalysts | HHT 1.5 | HHT 3 | KOH 0.75 | Kbut 1.0 |
|  | DBTDL 1.5 | DBTDL 3 | DBTDL 1.5 | DBTDL 1.5 |
| Emulsifiers | OS 710 0.8 | OS 710 0.8 | OS 710 0.8 | OS 710 0.8 |
|  | TDAO 3 | TDAO 3 | TDAO 3 | TDAO 3 |
| Blowing agents | F 11 10 | F 11 10 | F 11 10 | F 11 10 |
|  |  |  | F 12 3.0 | — |
| B Isocyanates | HMDI biuret 100 | HMDI biuret 50 | HMDI 100 | $H_{12}$MDI 100 |
|  |  | HMDI DPG 50 | — |  |
| Ratio B/100 A | 170 | 180 | 75 | 105 |
| Free density kg/m$^3$ | 260 | 250 | 180 | 200 |
| Pot life sec | 80 | 42 | 12 | 65 |
| Rise time sec | 120 | 80 | 50 | 140 |
| Molded density kg/m$^3$ | 600 | 500 | 700 | 600 |
| E-modulus |  |  |  |  |
| (flexural test) N/mm$^2$ | 1,400 | 1,200 | 1,400 | 1,300 |
| Flexural strength N/mm$^2$ | 35 | 30 | 25 | 30 |
| Compressive strain |  |  |  |  |
| at 10% compression N/mm$^2$ | 5 | 4 | 5 | 3 |
| Shore D hardness | 70 | 60 | 65 | 55 |
| ΔY (xenon test 500 h) | 0.5 | 1 | 0.5 | 3 |

Polyurethane rigid integral skin foam

| Example No. | 33 | 34 | 35 | 36 |
|---|---|---|---|---|
| Starting materials | Parts | Parts | Parts | Parts |
| Polyols | F 53 | F 53 | F 53 | F 53 |
|  | C 10 | C 10 | C 10 | C 10 |
| Chain extenders |  |  |  |  |
| A Crosslinking agents | TMP 18 | TMP 18 | TMP 18 | TMP 18 |
| Catalysts | HHT 1.5 | KOH 0.75 | KF 1.0 | HHT 3 |
|  | DBTDL 1.5 | DBTDL 3 | DBTDL 3 | DBTDL 3 |
| Emulsifiers | OS 710 2 | OS 710 2 | OS 710 2 | DS 710 2 |
|  | SM 0.6 | SM 0.6 | SM 0.6 | SM 0.6 |
| Blowing agent | F 11 10 | F 11 10 | F 11 10 | F 11 10 |
| B Isocyanates | HMDI biuret 50 | HMDI biuret 50 | — | HMDI biuret 50 |
|  | HMDI HPN 50 | HMDI HPN 50 | HMDI HPN 100 | HMDI 50 |
| Ratio B/100 A | 220 | 100 | 110 | 80 |
| Free density kg/m$^3$ | 125 | 200 | 200 | 200 |
| Pot life sec | 80 | 20 | 25 | 25 |
| Rise time sec | 135 | 60 | 75 | 65 |
| Molded density kg/m$^3$ | 700 | 600 | 750 | 600 |
| E-modulus |  |  |  |  |
| (flexural test) N/mm$^2$ | 1,200 | 1,400 | 1,200 | 1,300 |
| Flexural strength N/mm$^2$ | 25 | 30 | 35 | 40 |
| Compressive strain |  |  |  |  |
| at 10% compression N/mm$^2$ | 4 | 3 | 5 | 6 |
| Shore D hardness | 65 | 60 | 55 | 70 |
| ΔY (xenon test 500 h) | 3 | 2 | 0.5 | 5 |

Polyurethane soft integral skin form

| Example No. | 37 | 38 | 39 | 40 |
|---|---|---|---|---|
| Starting materials | Parts | Parts | Parts | Parts |
| Polyols | A 21 | A 21 | A 21 | A 21 |
|  | B 68 | B 68 | B 68 | B 68 |
| Chain extenders | B 1,4 8 | B 1,4 8 | B 1,4 8 | B 1,4 8 |
| A Crosslinking agents | EG 0.5 | EG 0.5 | EG 0.5 | EG 0.5 |
| Catalysts | Fe acetyl- |  |  |  |
|  | acetonate 1 | Zn Oct 3 | DBTDA 3 | DBTV 3 |
|  | KOH 0.75 | KOH 0.75 | KOH 0.75 | KOH 0.75 |
| Foam stabilizers | SM 0.25 | SM 0.25 | SM 0.25 | SM 0.25 |
| Blowing agent | F 11 15 | F 11 15 | F 11 15 | F 11 15 |
| B Isocyanates | HMDI biuret 100 | HMDI biuret 100 | HMDI biuret 100 | XDI 100 |
| Ratio B/100 A | 80 | 80 | 80 | 80 |
| Free density kg/m$^3$ | 150 | 120 | 180 | 160 |
| Pot life sec | 30 | 35 | 25 | 30 |
| Rise time sec | 55 | 60 | 45 | 75 |
| Molded density kg/m$^3$ | 350 | 400 | 450 | 500 |
| Tensile strength N/mm$^2$ | 1.5 | 1.0 | 1.2 | 1.1 |
| Elongation % | 150 | 120 | 130 | 110 |
| Tear propagation |  |  |  |  |
| resistance N/mm | 2.0 | 2.1 | 2.5 | 2.5 |
| Shore A hardness | 30 | 40 | 35 | 45 |

| | | | | |
|---|---|---|---|---|
| -continued | | | | |
| ΔY (xenon test 500 h) | 0.5 | 1 | 2 | 3 |

We claim:

1. A process for the manufacture of light-stable polyurethane integral skin foams by reacting a mixture of organic polyisocyanates, polyols, catalysts and blowing agents, with or without assistants and adjuvants, wherein the organic polyisocyanates used are selected from the group consisting of aliphatic polyisocyanates, cycloaliphatic polyisocyanates, modified aliphatic polyisocyanates, modified cycloaliphatic polyisocyanates and mixtures thereof and the catalysts used are synergistic catalyst combinations comprising (A) a strongly basic polyisocyanurate catalyst selected from the group consisting of alkali metal hydroxides, alkali metal alcoholates, alkali metal phenolates, alkali metal salts of weak acids, 1,3,5-tris-(N,N-dialkylaminoalkyl)-s-hexahydrotriazines and mixtures thereof and (B) dibutyl-tin dilaurate.

2. The process of claim 1 wherein the catalyst combination consists of (A) from 0.01 to 5 parts by weight of an alkali metal hydroxide, alkali metal alcoholate, alkali metal phenolate, alkali metal salt of a weak acid and/or 1,3,5-tris-(N,N-dialkylaminoalkyl)-s-hexahydrotriazine and (B) from 0.01 to 5 parts by weight of dibutyl-tin dilaurate, per 100 parts by weight of polyol.

3. The process of claim 1, wherein the organic polyisocyanate used is a urethane-modified aliphatic and/or cycloaliphatic polyisocyanate containing NCO groups.

4. The process of claim 3, wherein the urethane-modified polyisocyanate is prepared by reacting an aliphatic and/or cycloaliphatic diisocyanate and an alkanediol of 2 to 10 carbon atoms in the alkylene radical, in the molar ratio of about 2:1.

5. The process of claim 1, wherein the organic polyisocyanate used is an aliphatic and/or cycloaliphatic polyisocyanate containing biuret groups.

6. The process of claim 1, wherein the catalyst combination consists of tris-(dimethylaminopropyl)-s-hexahydrotriazine and dibutyl-tin dilaurate.

* * * * *